June 24, 1930. C. B. SAWYER 1,766,149
FLOW METER
Original Filed Sept. 21, 1925
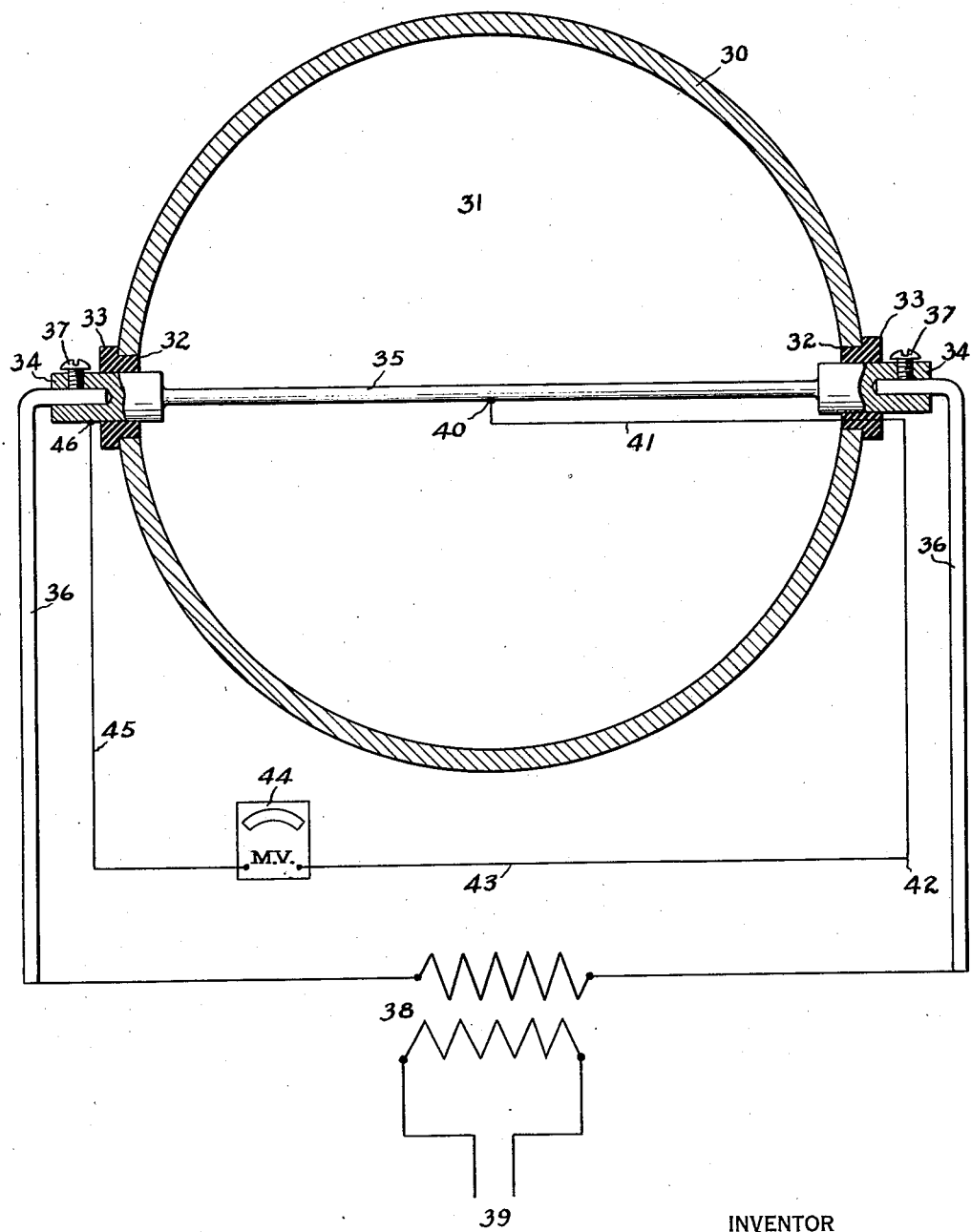

Patented June 24, 1930

1,766,149

UNITED STATES PATENT OFFICE

CHARLES B. SAWYER, OF CLEVELAND, OHIO, ASSIGNOR TO THE BRUSH LABORATORIES COMPANY, OF CLEVELAND, OHIO, A CORPORATION OF OHIO

FLOW METER

Original application filed September 21, 1925, Serial No. 57,549. Divided and this application filed March 30, 1928. Serial No. 266,063.

My invention relates to meters, and more particularly to meters adapted to determine characteristics of fluids, such as, for example, rate of flow.

This is a division of my copending application Serial No. 57,549, filed September 21, 1925, for flow meter.

In the arts it frequently becomes desirable to determine a characteristic or property of a fluid, such as of a vapor or gas. Thus, for example, it frequently becomes desirable to measure the quantity of steam passing through a conduit, in which case the characteristic to be determined is the rate of flow. It is desirable to determine such characteristics with a measuring apparatus or meter which is simple and rugged in design and construction, which is cheaply operated, and by means of which a desired characteristic of the flowing fluid may be readily determined. It is further desirable in such a meter that it shall not require frequent calibration.

An object of this invention is to provide an improved method of and means for determining characteristics of fluids.

Another object of my invention is to provide a flow meter of few parts and in general of simple and rugged construction.

A further object of my invention is to provide means for readily and simply obtaining data for the determination of any desired characteristic of a fluid.

Another object of my invention is to provide a fluid meter which may be readily maintained in operative and indicating condition to provide accurate and dependable data.

A further object of this invention is to provide an instrument for the determination of characteristics of fluids in which a constant rate of heat energy is supplied to a thermally sensitive body exposed to a flowing fluid, and a fluid characteristic determined by measuring the temperature of a point on said body.

Other objects will be apparent to those skilled in the art from the description of the invention hereinafter given.

I have discovered that a very satisfactory method of determining a characteristic or property of a flowing fluid is to insert into a conduit, through which the fluid is passing, a heated body which is thermally sensitive or, in other words, a body which is responsive to variations in those properties of the surrounding fluid which affect the rate of heat exchange between the fluid and the body. This thermally sensitive body, which may take the form of a metal tube or bar, may be supplied with heat at a constant rate, and elevated to a temperature above that of the flowing fluid. The temperature of any suitable point on the thermally sensitive body may then be taken, which temperature will be an indication of, and will vary with a characteristic of the fluid such as, for example, difference of the rate of flow, percentage of moisture, chemical composition, etc.

I have found that the construction of a suitable meter may be simplified and that the meter may be more easily maintained accurate, if the temperature of the thermally sensitive body is taken at any desired point. It will be seen that under such circumstances, the heating need not be equally distributed throughout the sensitive body, but may vary from place to place, provided that such variation is constant, which is the case when heat is supplied at a constant rate. I have found that a convenient means for supplying a constant rate of heat to the said thermally sensitive body is by electrical means, such as a suitable resistor heated preferably by alternating current of automatically regulated value. To determine the relative temperature of any fixed point on the thermally sensitive body I have found that an electrical pyrometer employing a thermocouple is very satisfactory. As previously mentioned, it is desirable to have the temperature of such thermally sensitive body high enough to be always above that of the fluid. The pyrometric method of determining temperatures by employing a thermocouple is particularly advantageous in that the temperature of a particular point on a thermally sensitive body may be obtained with respect to any other temperature such as, for example, the temperature of the fluid. These relative temperatures may be obtained by placing the hot junction of a thermocouple at a point on the thermally sensitive body, and by placing the cold junction of the thermocouple at the point with respect to which it is desired to know the temperature of the hot junction. As will be noted in the further description of my invention, the thermally sensitive body may be heated by a separate source of heat, such as a resistor, or the resistor and the thermally sensitive body may be integral.

In the drawing, the figure is a sectional view of an embodiment of my invention as installed in a conduit, the external electrical system being shown diagrammatically.

In the figure is indicated a conduit 30 through which a fluid 31 which is to be metered may be passed, such as for the purpose of determining the rate of flow thereof. The meter may comprise a thermally sensitive body 35 extending partially or entirely across the interior of the conduit, which said body 35 may be arranged to act both as a resistor and as a thermally sensitive body to dissipate heat to the fluid flowing in the conduit.

In conduit apertures 32 are shown the insulating plugs 33 in which are mounted the enlarged shoulders 34 of the member 35. The connections between the shoulders 34 and plugs 33, and plugs 33 and conduit 30 are preferably such as to form fluid-tight seals. The surface of the member 35 may be protected, if desired, from deleterious action of the fluid by any suitable protective coating such as may be formed by electroplating, varnishing, etc. The member 35 is preferably of a material of relatively high specific resistance and a material of substantially negligible temperature coefficient of resistance within the temperature range of usage, such as constantan. It is desirable that electrical energy be furnished to the resistor 35 at a constant current in order that the resistor 35 may be heated at an automatically controlled rate. The leads 36 are shown as electrically connected to portions 34 by the screws 37, said leads being also connected to the secondary winding of a constant current transformer 38, the primary winding of which is shown as supplied with electric energy from an alternating current supply circuit 39. With the above described electrical means it is obvious that heat energy may be supplied to member 35 at a constant and reproducible rate.

To determine a characteristic of a fluid at a given time, a temperature at such time of the member 35 may be determined. Any suitable temperature measuring means may be employed for this purpose but I prefer to employ a thermocouple pyrometric apparatus. In the drawing I have shown an iron wire 41 electrically joined, as by welding, to the constantan member 35 at any point 40, the wire 41 being shown as extending through the insulating plug 33 to point 42. The hot junction of the thermocouple is thus formed at the junction of the member 35 and wire 41, namely, at point 40. A constantan wire 43 may be electrically joined to wire 41 at point 42 to form the cold junction, which, as previously mentioned, may be placed in any suitable location. The wire 43 is shown as connected to a suitable electrical indicating instrument 44 such as a millivoltmeter or potentiometer for measuring the electric potential developed between the hot and cold junctions. As a convenient means of electric connection to complete the pyrometric circuit the instrument 44 may be connected by constantan lead 45 to the member 35 at point 46.

While I have thus described an iron-constantan couple for obtaining the temperature of point 40, it will be obvious that other thermoelements may be used, or temperature measuring devices other than those embodying thermocouples.

In operation, alternating current from a supply circuit 39 enters the primary winding of the constant current transformer 38, from the secondary winding of which electric energy at constant current is supplied to the resistor member 35. When the resistor 35 is of constant resistance the heat energy generated therein is constant in amount. This heat is dissipated in whole or in part into the flowing fluid 31. The temperature of any point 40 on the body 35 will depend on the characteristic of the fluid which is to be metered, such characteristic being, for example, the rate of flow. For example, a faster flowing fluid will carry away more heat from the body 35 and hence decrease the temperature of the point 40 to a greater degree than will a slower flowing fluid. Thus, from suitable calibration curves the characteristic of the fluid may be determined from the temperature of the point 40. It will be understood, of course, that in calibrating the instrument with respect to the difference in temperature between the point 40 and the point 42, the point 42 may be located at any desired place, for example, in the flowing fluid itself.

It will be readily understood that where the temperature of but one point of the thermally sensitive member 35 is measured, it is not essential that the temperature of all parts thereof be equal. Thus, the member 35 need not be of uniform section and may be sufficiently heavy to provide long life and ruggedness. It will be noted that the apparatus shown is simple and rugged in construction, reliable in its results, and may be manufactured cheaply and simply.

It will be understood that my invention may be employed not only to measure quantities or amounts of fluids, such as of gases and liquids, but may also be used to determine other fluid characteristics such as chemical composition, percentage of moisture, etc., in which case the fluid may be either moving at a constant rate or stationary, the fluid characteristic being determined by the change of temperature of a point in the thermally sensitive body when such body is immersed in the fluid.

It will be seen that in my invention, with the improved apparatus, I am enabled to supply heat to a thermally sensitive body not only at a constant rate but also at a reproducible rate so that the results obtained at one time may be readily compared and correlated with results obtained at any other time. The simplicity and ruggedness of the apparatus and method of obtaining measurements also assist in obtaining reliable results and reduce to a great extent the necessity for frequent calibration of the apparatus.

It will also be noted that by my invention I have provided simple and reliable means for determining the characteristics of fluids which means may be readily constructed and maintained in operating condition without difficulty. It is, of course, obvious that the drawing illustrates but one of the many possible means for carrying out my invention.

To those skilled in the art, many modifications and widely differing embodiments of my invention will be apparent, and my invention is to be in no wise limited by the disclosures contained herein, except as limited by the appended claims.

What I claim is:

1. In a device of the class described for determining the rate of flow of a fluid, the combination of an electric resistor of negligible temperature coefficient of resistance placed in heat interchanging relation with the flowing fluid, a source of electric energy at constant current for the resistor, and a thermocouple pyrometer for measuring the temperature of a point on the resistor.

2. In a device of the class described for determining the rate of flow of a fluid, the combination of an electric resistor of constantan and placed in heat interchanging relation with the flowing fluid, a constant current transformer for providing electric energy at constant current for the resistor, and a thermocouple pyrometer for measuring the temperature of a point on the resistor.

3. In a device of the class described for determining the rate of flow of a fluid, the combination of an electric resistor of negligible temperature coefficient of resistance placed in heat interchanging relation with the flowing fluid, a wire connected to the resistor at the point at which the temperature of the resistor is to be noted, the resistor and wire forming, at the point of connection, the hot junction of a thermoelement having hot and cold junctions, and means for measuring the electric potential developed between the hot and cold junctions.

4. In a device of the class described for determining the rate of flow of a fluid through a conduit, the combination of an electric resistor of constantan placed in the conduit in heat interchanging relation with the flowing fluid, a constant current transformer for providing electric energy for the resistor, an iron wire welded to the resistor at the point at which the temperature of the resistor is to be taken, the constantan resistor and iron wire forming, at the point of weld, the hot junction of a thermoelement having hot and cold junctions, and means for measuring the electric potential developed between the hot and cold junctions.

5. In a meter for determining a characteristic of a fluid, in combination, a thermally sensitive body of relatively high electrical constant resistivity arranged to be disposed in heat interchanging relation with a fluid, means for supplying alternating current to said thermally sensitive body including a constant current transformer, whereby said thermally sensitive body may be heated at an automatically controlled rate, and means for determining a temperature of said thermally sensitive body.

6. In a device of the class described for determining the rate of flow of a fluid, the combination of an electric resistor of negligible temperature coefficient of resistance placed in heat interchanging relation with the flowing fluid, a constant current transformer for providing electric energy at constant current for the resistor, and a thermocouple pyrometer for measuring the temperature of a point on the resistor.

In testimony whereof I hereunto affix my signature.

CHARLES B. SAWYER.